United States Patent [11] 3,577,100

[72] Inventors Robert E. Askew
Berkeley Heights;
Henry C. Johnson, Neshanic, N.J.
[21] Appl. No. 803,156
[22] Filed Feb. 28, 1969
[45] Patented May 4, 1971
[73] Assignee The United States of America as represented by the Secretary of the Army

[54] METEOROLOGICAL DEVICE EMPLOYING A TEMPERATURE COMPENSATED TRANSMITTER
9 Claims, 3 Drawing Figs.
[52] U.S. Cl. .............................................. 331/117,
325/105, 325/111, 325/113, 331/101, 333/83, 340/208
[51] Int. Cl. ...................................................... H04b 1/02
[50] Field of Search.......................................... 340/208;
325/105, 111, 113; 331/117, 101, 176; 333/83

*Primary Examiner*—John Kominski
*Attorneys*—Harry M. Saragovitz, Edward J. Kelly, Herbert Berl and Jess J. Smith, Jr.

ABSTRACT: This invention relates to a meteorological device that is used to transmit atmospheric conditions such as temperature, pressure, humidity, or the like, to a remote station. The transmitter of such device utilizes temperature-compensating means with a high-frequency transistor oscillator thereby obtaining a highly stable output over a wide temperature range. Temperature compensation is provided by mounting the transistor directly onto dual resonant coaxial cavities with one cavity connected to the transistor emitter and the other cavity connected to the base lead. The cavities are constructed of dissimilar metals thereby providing temperature dependent capacitance. The cavities are provided with sets of adjusting screws to provide for adjustments in cavity resonance brought about by both lateral and transverse unequal expansion in the cavities.

PATENTED MAY 4 1971

3,577,100

FREQUENCY MHz

RF POWER OUTPUT mW

EFFICIENCY Per Cent

TEMPERATURE - °C

INVENTORS
ROBERT E. ASKEW &
HENRY C. JOHNSON

BY: J J Smith, Jr  AGENT
Harry M. Saragovitz, Edward J. Kelly,
& Herbert Berl  ATTORNEYS

METEOROLOGICAL DEVICE EMPLOYING A TEMPERATURE COMPENSATED TRANSMITTER

BACKGROUND AND SUMMARY OF THE INVENTION

Rocket- and balloon-carried scientific instruments have seen wide utility for a number of years in gathering meteorological data of the upper atmosphere. Since the data-gathering package, sometimes known as a radiosonde or rocketsonde, is subjected to the rigors of launch or recovery and varying environments, the transmitter placed therein must be ruggedly constructed with as stable an output frequency as possible with respect to temperature changes. The device of the instant invention accomplishes these tasks by providing an improved rocketsonde with substantially flat frequency response over a wide range of temperatures.

It is the objective of this invention to produce a compact, lightweight, low cost, highly stable L-band solid-state rocketsonde capable of withstanding in excess of 75 G's, axial and longitudinal, acceleration and providing an output of approximately one-fourth watt.

Earlier work in this particular field has employed various techniques including the use of a single cavity oscillator followed by a multiplier section to attain the desired frequency. Likewise, another type radiosonde has been constructed using the stripline oscillator; however, this approach has not been entirely successful. Inasmuch as the device of the instant invention employs a fundamental frequency oscillator, there is no multiplication effect of frequency change occasioned by a variation in supply voltage. Here also, two resonant cavities are used to increase the effective Q and thus improve transmitter pulling figure.

BRIEF DESCRIPTION OF THE DRAWING

The exact nature of this invention will be readily apparent from consideration of the following specification relating to the annexed drawing in which.

DESCRIPTION OF THE PREFERRED EMBODIMENT

Figure 1:
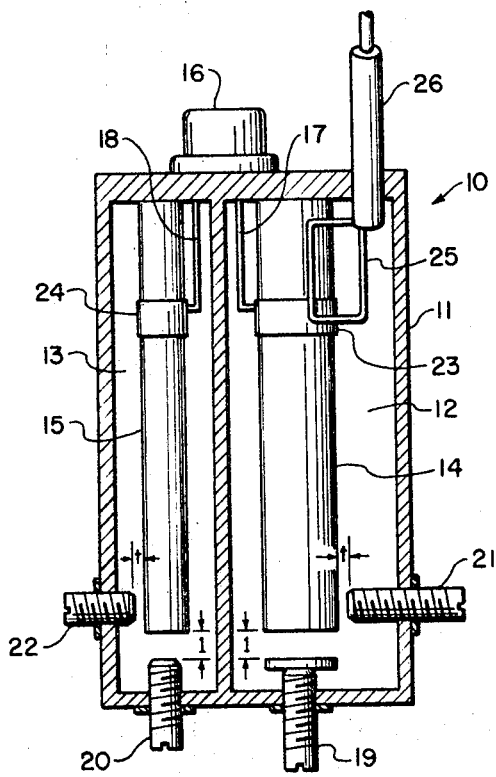
FIG. 1 shows a partial sectional view of the preferred embodiment of the invention.

Referring now to the drawings, wherein like reference characters designate like or corresponding parts throughout the several views, there is shown in FIG. 1 a partial cross section of the cavity oscillator 10 used in the rocketsonde to transmit atmospheric conditions such as temperature, pressure, humidity or the like to a remote station. There is shown housing 11 containing cavities 12 and 13. Mounted inside each of the cavities 12 and 13 are two center conductors 14 and 15. Transistor 16, having base 17 and emitter 18 leads, is mounted directly onto housing 11. Since a high-frequency transistor oscillator normally has a negative temperature coefficient, that is, its oscillating frequency goes down when the ambient temperature goes up, some sort of temperature compensating means must be employed to maintain oscillator frequency within desired limits. Temperature compensation in the instant invention is achieved by constructing the housing 11 and the center conductors 14 and 15 of dissimilar metals with different thermal coefficients of expansion and by providing sets or pairs of end tuning screws 19 and 20, and side tuning screws 21 and 22. Housing 11 is constructed of brass or silver plated brass with a coefficient of thermal expansion of approximately $18.9 \times 10^{16}$ cm./cm.° C. while center conductors 14 and 15 are constructed of copper with a coefficient of thermal expansion of approximately $16 \times 10^{16}$ cm./cm.° C. The transistor 16, a TA 2800 transistor has been successfully employed, leads 17 and 18 are coupled to center conductors 14 and 15 by means of copper coupling sleeves 23 and 24 which have been coated with 1 mil thick Teflon. The sleeve capacitance and lead impedance form the matching circuit between the transistor 16 and the resonant cavities 12 and 13. Coaxial output 26 is provided with output coupling loop 25 to feed a suitable antenna (not shown).

When an oscillator circuit is connected to the cavities 12, 13 and is tuned to resonance using only the capacitance formed between the ends of the center conductors 14, 15 and the end tuning screws 19, 20, the oscillator has a positive temperature coefficient. Conversely, when only the side tuning screws 21, 22 are used for tuning to resonance, the device has a negative temperature coefficient. By distributing the capacitance required for resonance between the end tuning screws 19, 20 and the side tuning screws 21, 22, an essentially flat frequency versus temperature characteristic is achieved. The differences in the coefficients of expansion cause the capacitance formed between the ends of the center conductors 14 and 15 and the end tuning screws 19 and 20, that is, across dimension 1, to decrease with increasing temperature whereas the capacitance formed between the center conductors 14 and 15 and side tuning screws 21 and 22, that is across dimension $t$, remain approximately constant with increasing temperature. If all the required capacitance for resonance is formed by the side tuning screws 21 and 22, the natural tendency of the transistor 16 to cause decreasing frequency output with increasing temperature would predominate. On the other hand, if all the capacitance for resonance is formed by the end screws 19 and 20, the oscillating frequency would increase rapidly with increasing temperature. It is obvious, then, that the desired amount of compensation can be achieved by distributing the capacitance between the two sets of screws 19, 20 and 21, 22.

Figure 2:
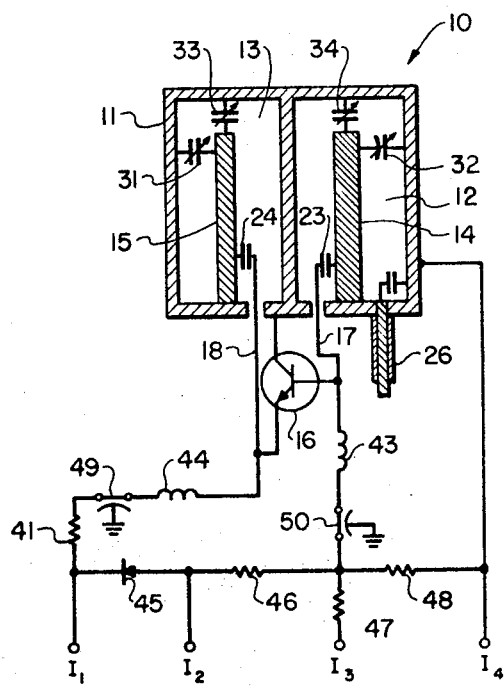
FIG. 2 illustrates a diagram of one circuit used with the cavities of FIG. 1.

There is shown in FIG. 2 the cavity oscillator 10 described above with the circuitry employed in constructing the rocketsonde transmitter of the instant invention that is capable of producing a highly stable output. A grounded collector oscillator circuit is provided with the emitter 18 and base 17 leads capacitively coupled into their respective cavities 13 and 12. Capacitors in the form of copper sleeves 23 and 24 together with the coupling loops formed by leads 17 and 18 provide the proper matching of the transistor into the cavity and also provide DC blocks for the transistor leads 17 and 18. Small quarter wavelength etched high-impedance RF chokes 43 and 44 are mounted inside each of the cavities 12 and 13 to provide the necessary biasing connections through 1,500 pF feedthrough capacitors 49 and 50 mounted in the wall of housing 11. A highly stable negative 20 volt DC input voltage is provided at $I_1$, through a 10 ohm current limiting resistor 41. Base bias resistors 46 and 48, 200 and 3.3 k ohms respectively, were employed in the devices actually constructed with these values varying depending on the dimensions and placement of the transistor lead loops 17 and 18. Forward biased silicon diode 45, 1N461 in the circuit constructed, is used to replace a rather bulky and expensive silicon resistor used in earlier tests thereby providing for a more compact and inexpensive transmitter. Since the forward biased diode 45 has a negative temperature coefficient, additional temperature compensation is provided in addition to the current leveling effect in the base-emitter biasing circuit. Frequency modulation is provided by changing the base bias through a 690 ohm series resistance 47 at input $I_3$. When a pulse input of negative 3 volts is provided to terminal $I_2$ the oscillator cuts off thereby providing for amplitude modulation. Terminal I4 is provided for a positive voltage and housing 11 ground. Variable capacitors 31, 32, 33, and 34 are shown here in FIG. 2 as schematically representing the electrical characteristics of tuning screws 19, 20, 21, and 22 of FIG. 1. It may readily seem that inputs $I_2$ and $I_3$ may be employed with atmospheric sensors that are capable of measuring temperature, pressure, humidity, or the like as well as other devices or equipment requiring a highly stable oscillator over a wide range of temperatures.

Figure 3:
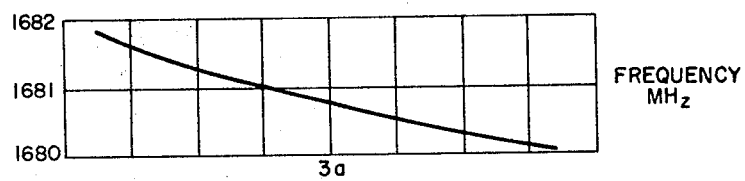
FIG. 3 shows the performance curves of the rocketsonde transmitter of the instant invention.
Figure 3:
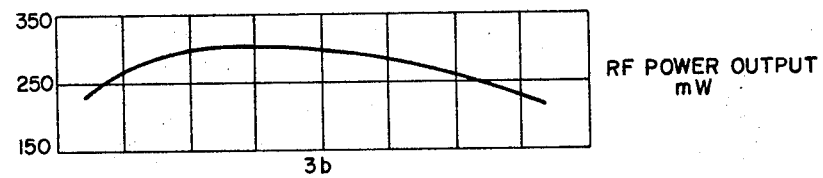
Figure 3:
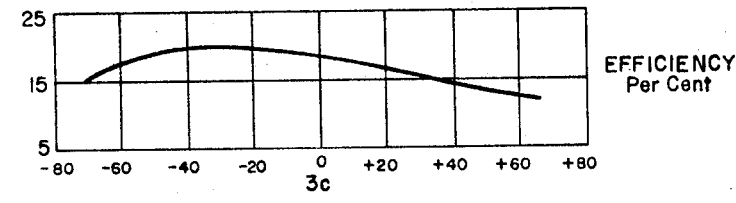

Turning now to FIG. 3 we see the performance characteristics for the device of the instant invention, and particularly, of the circuitry shown in FIG. 2. For example, it is seen from FIG. 3a that the transmitter has a frequency variation of less than 2 MHz. over the temperature range of −70° C. to +70° C. Likewise, the power output and efficiency of the transmitter can be seen from FIGS. 3b and 3c respectively. Although not shown by the above described FIGS. it has been found that the output power, efficiency and pulling figure (the frequency change for a load VSWR of 1.5 to 1 which is variable in phase through 360 electrical degrees) can be substantially improved by changing the effective area of the output coupling. A further advantage of the instant device over those of the prior art is that the instant invention has a pushing figure, the sensitivity of the operating frequency to supply voltage change of less than one-fourth of the earlier devices and is typically less than 0.5 MHz. per volt. Spurious output measurements have been made with the second harmonic measured approximately 40 db. the fundamental and the third harmonic approximately 20 db. the second harmonic.

Although the cavities 12 and 13 are shown in FIGS. 1 and 2 as being part of the same housing for purposes of simplicity of description, the cavities actually constructed were formed from a ⅝-inch cylindrical section for base cavity 12 with the emitter cavity 13 being formed from a ⅝-inch cylindrical section thereby giving a housing diameter of approximately 1 inch with electrical contact therebetween. The overall length of the transmitter actually constructed was less than 3 inches with a weight of less than 3 ounces.

It should be understood, of course, that the foregoing disclosure relates to only a preferred embodiment of the invention and that numerous alterations may be made therein without departing from the spirit and scope of the invention as set forth in the appended claims.

We claim:

1. A rocketsonde, used for measuring atmospheric conditions having a highly stable oscillator, said oscillator comprising:
   dual cavities for maintaining oscillator resonance, said dual cavities being constructed of a material having a coefficient of thermal expansion and being closely juxtaposed so as to be in electrical contact;
   center conductors mounted inside each of said cavities and fabricated of a material having a different coefficient of thermal expansion than said dual cavities;
   adjusting means for changing the resonant frequency of said cavities and for maintaining said oscillator at substantially the same frequency as the rocketsonde is subjected to various atmospheric conditions when said center conductors and said cavities expand and contract at unequal rates;
   power supply means connected to said oscillator, and;
   output means coupled to one of said dual cavities for transmitting to a remote station.

2. The rocketsonde oscillator according to claim 1, and further comprising:
   a transistor mounted on said dual cavities, said transistor having an emitter, collector, and base lead;
   said power supply means is connected so as to negatively bias said emitter;
   means for capacitively coupling said emitter to said one of said center conductors;
   means for capacitively coupling the base of said transistor to the other of said center conductors;
   said output means is coupled to the cavity containing said base, and;
   means for grounding said collector to said cavities.

3. The rocketsonde oscillator according to claim 2, and further comprising:
   said means for negatively biasing said emitter comprises a current limiting resistor connected in series with a feedthrough capacitor in a cavity wall and an RF choke mounted inside said cavity containing said emitter;
   means for connecting said cavities and said base through a resistor in series with a feedthrough capacitor in a cavity wall and an RF choke mounted inside said cavity containing said emitter, and;
   current leveling means connected between said means for connecting and said negative biasing means.

4. The rocketsonde oscillator according to claim 3, and further comprising:
   said current leveling means comprises a series-connected resistor and silicon diode.

5. A highly stable oscillator comprising:
   dual resonant cavities fabricated of a material having one coefficient of thermal expansion;
   center conductors mounted in each of said dual cavities and fabricated of a material having a second coefficient of thermal expansion thereby providing capacitance changes between said center conductors and said cavities as said center conductors and said cavities unequally expand and contract when subjected to temperature changes, and
   a transistor oscillator circuit connected to said cavities in such a manner that said transistor base is capacitively coupled to one of said dual resonant cavities, said transistor emitter is capacitively coupled to the other of said dual resonant cavities and to a negative power source, and said transistor collector is grounded to said dual resonant cavities thereby producing a highly stable transistor oscillator.

6. A device for use in a highly stable oscillator, that is subject to varying environmental conditions, comprising:
   a pair of cylindrically shaped cavities each having wall, enclosed ends, and a longitudinal axis, said cavities being constructed of a material having a first coefficient of thermal expansion, said cavities being placed adjacent to each other and in electrical contact;
   center conductors having first and second ends mounted inside said dual cavities with said first end in electrical contact with said cavity ends and parallel to the longitudinal axes thereof, said center conductors being fabricated of a material having a second coefficient of thermal expansion so that the capacitance between said cavities and said center conductors is divided between said cavity ends and said second end of said center conductors and between said cavity walls and said second end of said center conductors as said center conductors and said cavities unequally expand and contract as said device is subjected to varying environmental conditions.

7. The resonant device according to claim 6 and further comprising:
   sets of adjusting screws mounted in the ends of each cavity and in the walls of each cavity adjacent to the second ends of said center conductors for distributing the capacitance required for resonance between the second end of said center conductors and the ends of said cavities and between the second end of said center conductors and said cavity walls thereby giving said oscillator an essentially flat frequency versus temperature characteristic.

8. A dual coaxial transistor oscillator that is highly stable over a wide range of environmental conditions comprising:
   a pair of cylindrically shaped cavities each having walls, enclosed ends, and a longitudinal axis, said cavities being constructed of a material having a first coefficient of thermal expansion, said cavities being placed adjacent to each other and in electrical contact;
   center conductors having first and second ends mounted inside said dual cavities with said first end in electrical contact with said cavity ends and parallel to the longitudinal axis thereof, said center conductor being fabricated of a material having a second coefficient of thermal expansion so that the capacitance between said cavities and said center conductors is divided between said cavity ends and said second end of said center conductors and between said cavity walls and said second end of said center conductors as said center conductors and said cavities unequally expand and contract as said device is subjected to varying environmental conditions;

a transistor mounted on said cavities and having a base, emitter, and collector; said base being capacitively coupled to one of said center conductors and to the wall of one of said cavities; said emitter being negatively biased and capacitively coupled to the other of said center conductors; said collector being connected to the wall of one of said cavities, thereby providing oscillations within said cavities;

at least one adjusting screw mounted in the wall of one of said cavities thereby providing frequency adjustment means and providing said oscillator with an essentially flat oscillating frequency versus temperature characteristics over a wide range range of environmental conditions.

9. The device according to claim 8, and further comprising:

coupling means attached to one of said cavities for transmitting said oscillations to a remote station.

UNITED STATES PATENT OFFICE
CERTIFICATE OF CORRECTION

Patent No. 3,577,100          Dated 5/4/71

Inventor(s) ROBERT E. ASKEW & HENRY C. JOHNSON

It is certified that error appears in the above-identified patent and that said Letters Patent are hereby corrected as shown below:

column 1, line 68, "$18.9 \times 10^{16}$" should read -- $18.9 \times 10$ and in line 70, "$16 \times 10^{16}$" should read -- $16 \times 10^{-6}$ --;

column 3, line 15, "40 db" should read -- 40 db below --;

and in line 16, "20 db" should read -- 20 db below --;

claim 6, line 3, "wall" should be -- walls --.

Signed and sealed this 28th day of November 1972.

(SEAL)
Attest:

EDWARD M. FLETCHER, JR.
Attesting Officer

ROBERT GOTTSCHALK
Commissioner of Patent